United States Patent [19]

Blattner

[11] 4,195,589

[45] Apr. 1, 1980

[54] INDICATING DEVICE FOR TORQUE WRENCHES

[75] Inventor: Raymond J. Blattner, Palos Hills, Ill.

[73] Assignee: Dresser Industries, Inc., Dallas, Tex.

[21] Appl. No.: 956,831

[22] Filed: Nov. 2, 1978

[51] Int. Cl.² ........................................... G01D 13/24
[52] U.S. Cl. ..................................... 116/212; 73/139;
116/DIG. 47; 116/296
[58] Field of Search ................................ 73/1 C, 139;
116/DIG. 3, DIG. 6, DIG. 23, 293, 296, 327,
328, 331, 332, 212, DIG. 47

[56] References Cited

U.S. PATENT DOCUMENTS

| | | | |
|---|---|---|---|
| 3,076,362 | 2/1963 | Able | 73/139 X |
| 3,304,771 | 2/1967 | Ochs | 73/139 |
| 3,678,744 | 7/1972 | Blattner | 73/139 |
| 3,788,132 | 1/1974 | Trimble et al. | 73/139 |

*Primary Examiner*—Charles A. Ruehl
*Attorney, Agent, or Firm*—J. N. Hazelwood; R. L. Van Winkle

[57] ABSTRACT

The improved indicating device is constructed from a single piece of resilient material such as Delrin or Teflon and includes a bifurcated friction portion that is disposed in a groove in the wrench. The friction portion is constructed so that the tines can be deformed to pass through a narrow slot and frictionally engage sides of the groove. The indicator member also includes an upstanding portion that is engageable with the pointer of the torque wrench to move the indicator as the pointer moves relative to the torque scale. Since the indicator member is in frictional engagement with the torque wrench, the indicator remains at the maximum torque after releasing the torque from the wrench and permitting the pointer to return to zero, thereby facilitating reading the maximum torque exerted.

6 Claims, 6 Drawing Figures

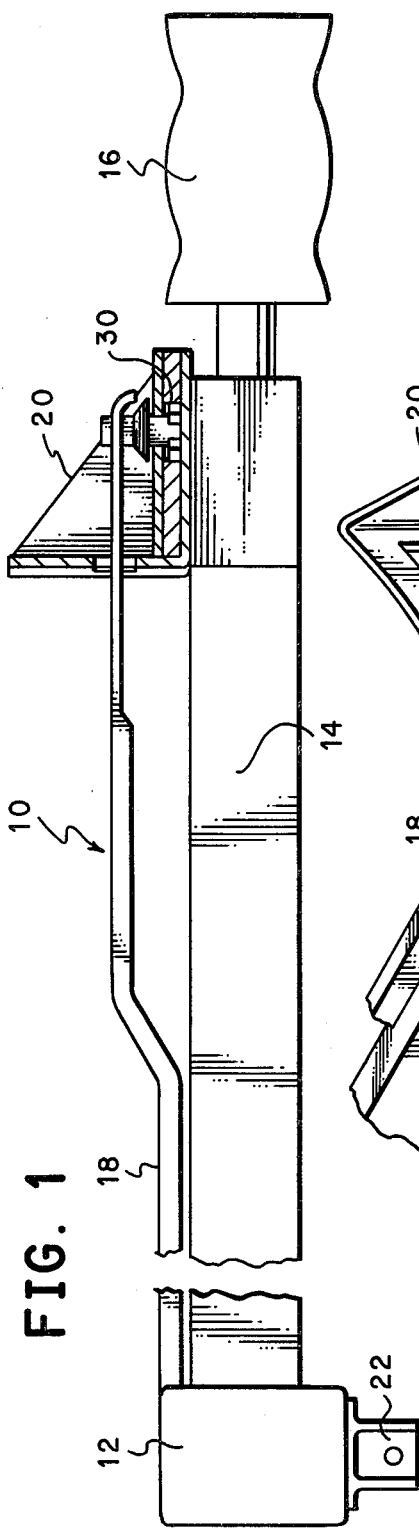
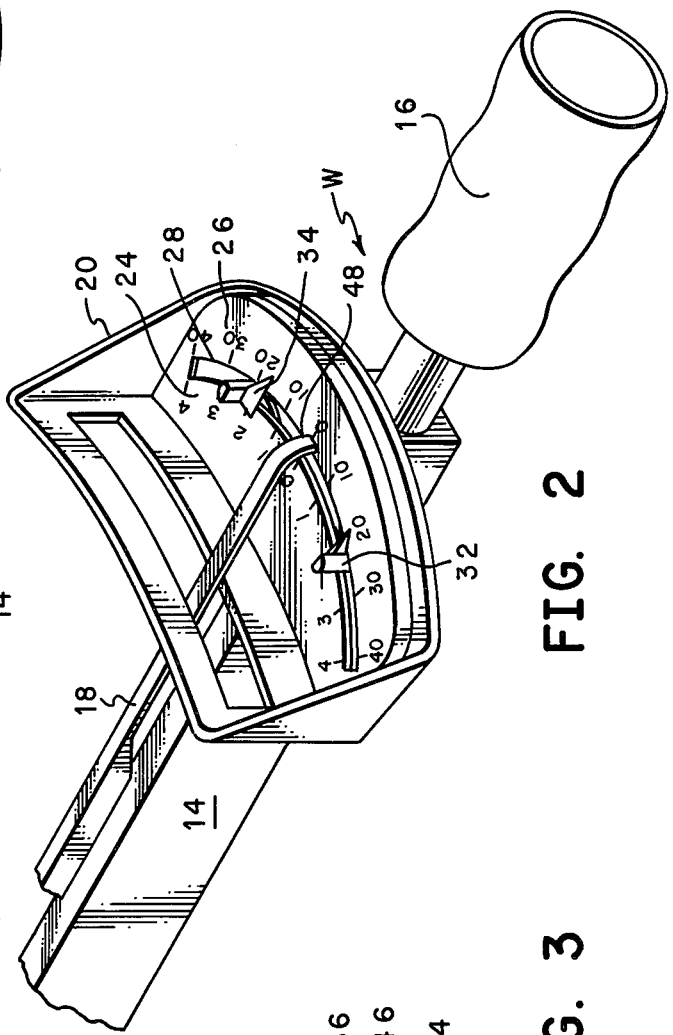
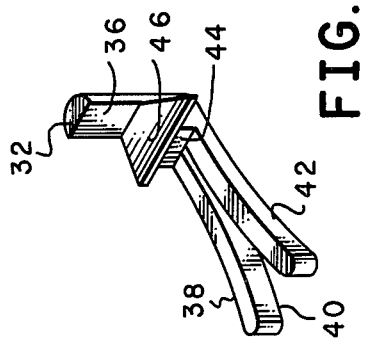

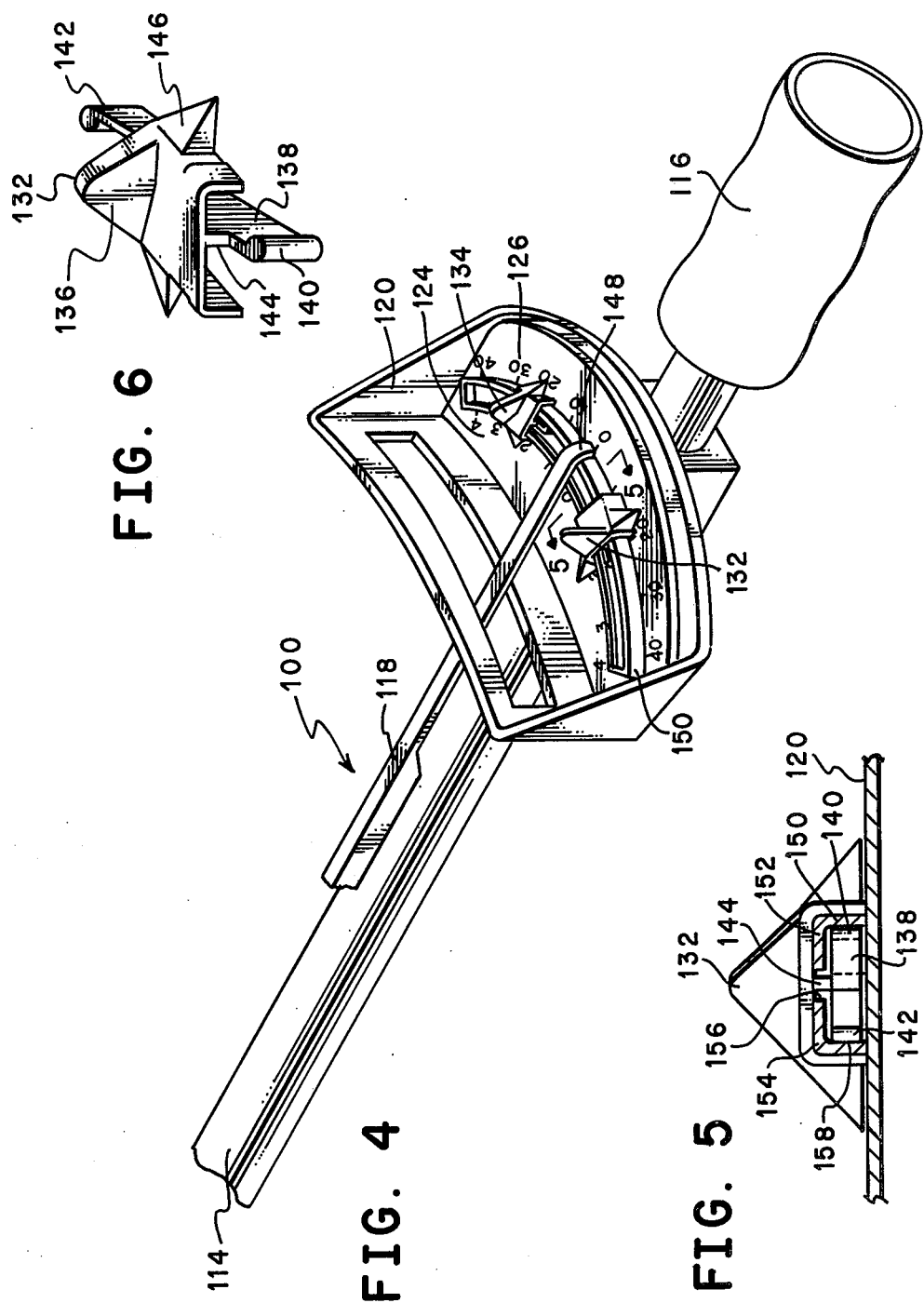

INDICATING DEVICE FOR TORQUE WRENCHES

BACKGROUND OF THE INVENTION

This invention relates generally to improved torque wrenches. More specifically, but not by way of limitation, this invention relates to an improved indicating device for torque wrenches that records the maximum torque reading as distinguished from a visual reading of the torque at the time that the torque is applied.

U.S. Pat. No. 3,304,771 issued to Paul Ochs on Feb. 21, 1967 illustrates a similar indicating device for torque wrenches. It will be noted in that patent that the torque graduations are located on only one side of the arcuate track that is provided for the indicator. With the track constructed as shown in the Ochs patent, it would be very difficult, if not impossible, to provide dual graduations for torque units showing both metric and English units on the same wrench.

Another patent illustrating a torque wrench having a sliding indicator is U.S. Pat. No. 3,076,362 issued to E. T. Able on Feb. 5, 1963. In a wrench constructed in accordance with that patent, a single sliding indicator is provided which is moved by the pointer to indicate the maximum torque applied. The indicator is retained by friction at that point. It should be noted in the detail description of the indicator that the indicator described is complicated in construction. However, that indicator does provide a means for accommodating more than one torque scale on the wrench.

SUMMARY OF THE INVENTION

This invention provides an improved indicating device for torque wrenches or the like that is of unitary construction and made from a resilient material. The indicator member includes an upstanding portion that is engageable with the pointer for moving the indicator, an indicating portion that is disposed outside the groove to indicate the torque, a narrow connecting portion that extends through a slot in the scale and a friction portion that includes angularly disposed end portions that are wider than the slot and groove in an unstressed condition. The friction portion is deformable to pass through the slot into the groove to frictionally engage the wrench in the groove.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein:

FIG. 1 is a view partially in elevation and partially in cross-section of a torque wrench incorporating an indicator device that is constructed in accordance with the invention.

FIG. 2 is a partial, pictorial view of the torque wrench of FIG. 1.

FIG. 3 is a pictorial view, greatly enlarged, to illustrate the structure of the indicator device utilized in the wrench of FIG. 1.

FIG. 4 is a view similar to FIG. 2, but illustrating another embodiment of indicator device that is also constructed in accordance with the invention.

FIG. 5 is a cross-sectional view taken through a portion of the wrench in FIG. 4 showing the indicator device in the track provided on the wrench.

FIG. 6 is an enlarged pictorial view illustrating the indicator device utilized in the wrench of FIG. 4.

DETAILED DESCRIPTION OF THE PREFERRED EMBODIMENT

Referring to the drawing and to FIG. 1 in particular, shown therein and generally designated by the reference character 10, is a torque wrench constructed in accordance with the invention. The torque wrench 10 includes a work engaging portion 12 connected by a lever 14 to a handle 16. Also connected to the work engaging member 12 is a pointer 18 that extends generally parallel to the lever 14 terminating adjacent a torque scale 20 that is mounted on the lever 14. It will be understood that the work engaging member 12 may include a socket (not shown) mounted on a square drive portion 22 that is part of the work engaging member 12.

As may be seen in FIG. 2, the pointer 18 has its terminal end disposed adjacent the torque scale 20. The torque scale 20 includes two sets of graduations 24 and 26, which in most instances, one would be metric and one English torque units. However, it should also be appreciated that one scale may be graduated in inch-pounds or inch-ounces while the other may be graduated in foot-pounds if desired.

An arcuate slot 28 extends through the upper surface of the scale 20 and opens into a wider arcuate groove 30 (See FIG. 1). Located in the arcuate groove 30 are indicator members 32 and 34. The indicator members 32 and 34 are identical in construction although oppositely disposed in the groove for purposes that will become more apparent hereinafter.

As may be seen in FIG. 3 the indicator member 32 includes an upstanding portion 36 and a bifurcated friction portion 38 that includes tines 40 and 42. The friction portion 38 is connected to the upstanding portion 36 by a connecting portion 44 that is approximately the same width as the arcuate slot 28. The indicator member 32 also includes an indicating portion 46 which in the preferred form of construction is sufficiently long to extend over both of the sets of graduations 24 and 26. As previously mentioned, it is preferred that the indicator members 32 and 34 be constructed from a resilient material such as Delrin or Teflon and it should also be noted that the indicator members are of very simple integral construction.

The upstanding portion 36 of the indicator members is relieved from the edge of the indicating portion 46 so that when the upstanding portion 36 is engaged by the pointer 18, the edge of the indicator portion 46 will align with the center of or with the index mark 48 that is provided on the end of the pointer 18. It should also be pointed out that the free ends of the tines 40 and 42 in the unstressed condition as illustrated in FIG. 3, are wider than the width of the slot 28 and wider than the width of the groove 30. Accordingly, it is necessary to deform the tines 40 and 42 relatively together to place the indicator members 32 and 34 into the groove 30 by passing them through the slot 28. When the indicator members 32 and 34 have been placed in the groove 30 with the tines 40 and 42 released, they spring outwardly due to the resiliency of the material and frictionally engaged the walls of the groove 30. The spacing and strength of the tines have been designed so that the members 32 and 34 can be moved by the pointer 18, but will have sufficient fricional engagement with the scale 20 to retain the indicator members 32 and 34 in the last position to which they have been moved even after the pointer 18 has returned to zero. Thus, the indicator members 32 and 34 will indicate the highest magnitude of torque that has been applied by the torque wrench 10.

OPERATION OF THE PREFERRED EMBODIMENT

If desired, a socket may be placed on the square drive 22 of the work engaging member 12 and engaged with a threaded fastener (not shown). The fastener is tightened by rotating the torque wrench 10 until the fastener begins to resist rotation. At this point, additional force exerted on the handle 16 causes the lever 14 to deflect and since the pointer 18 remains stationary, the scale 20 moves relative to the lever pointer 18 carrying either the indicator member 32 or the indicator member 34 therewith, until the maximum force to be applied to the fastener is obtained. At that point, the handle 16 is released permitting the lever to straighten out and scale 20 returns so that the pointer 18 indicates the zero position. The indicator member or members remain at the pointer maximum torque due to their frictional engagement with the scale 20.

An advantage of having the indicator members remain at the maximum torque position, is that frequently it is not possible to see the torque scale because of the position of the threaded fastener. When this situation occurs, the wrench can be removed from the fastener and moved to a position where the scale and the position of the indicator 32 or 34 relative to the graduations can be observed.

DESCRIPTION OF THE EMBODIMENT OF FIG. 4

FIG. 4 illustrates a modified form of torque wrench that is designated by the character reference 100. FIG. 4 is a fragmentary view, and it will be understood that the torque wrench 100 will include a work engaging member as illustrated in FIG. 1.

The torque wrench 100 includes, in addition to the work engaging member, a lever 114 of circular cross-section, a handle 116, and a pointer 118 which, although not shown, is connected with the work engaging member. The pointer 118 terminates against the scale 120.

The scale 120 is mounted on the lever 114 and moves therewith as does the scale 20 which is mounted on the lever 14 described in connection with FIG. 1. Torque graduations 124 and 126 are located on each side of a track 150 that is mounted on the upper surface of the scale 120.

As can be seen more clearly in FIG. 5, the track 150 is constructed from two L-shaped portions, 152 and 154, that are oriented in opposite directions providing a slot 156 therebetween. The members 152 and 154, in addition to forming the slot 156, provide a relatively wide groove that is designated by the reference character 158.

Slidably mounted on the track 150 are indicator members 132 and 134. The indicator members are identically constructed but oriented in opposite directions when positioned on the track 150. In view of the identical construction, only one of the indicator members will be described in detail.

As shown in FIG. 6, the indicator member 132 includes an upstanding portion 136 that is engageable with the pointer 118 to move the indicator members 132 and 134 along the track 150. The indicator member 132 also includes a friction portion 138 that has angularly disposed end portions or tines 140 and 142. The lower friction portion 138 is connected to the upstanding portion 136 by a narrow connecting portion 144 that is designed to extend through the slot 156. The indicator member 132 also includes an indicating portion 146 which is designed to overlay the graduations 124 and 126. It should also be pointed out that the indicating portion 146 is arranged so that when either of the indicator members 132 or 134 is engaged by the pointer 118, the indicating portion 146 will be in alignment with an index mark 148 on the pointer 118.

Referring again to FIG. 5, it can be observed that the friction portion 138 is obviously too wide to pass through the slot 156. However, since the members 132 and 134 constructed from a resilient material as were the members 32 and 34 as previously described, the tines 140 and 142 can be deformed to a position permitting the friction portion 138 to be passed through the slot 156. In this position, the members 132 and 134 are trapped in the track 150 since the members overlie a portion of the track and the friction portion 138 is disposed within the groove 158. As was true with the indicator member 32, the tine portions 140 and 142 frictionally engage the track 150 inside the groove 158 so that the indicator members 132 and 134 will remain in the position to which they are moved by the pointer 118 during operation of the torque wrench 100.

It is not believed to be necessary to describe in detail the operation of the torque wrench 100 since it performs identically to the torque wrench 10 which has been previously described.

It should be understood from the foregoing detailed description that the torque wrench described herein includes an improved indicator means that are rather simple in structure and that are effective to indicate torque imposed on the wrench while at the same time permitting the use of dual scales on the torque wrenches.

The foregoing detailed description is provided by way of example only and it should be understood that many changes and modifications should be made thereto without departing from the spirit of the invention.

The embodiments of the invention in which an exclusive property or privilege is claimed are defined as follows:

1. An improved indicating device for torque wrenches or the like that include a lever having a handle at one end and a work engaging member at the other end and a pointer that moves in response to the application of torque to a threaded fastener or the like, the improvement comprising:

scale means mounted on the lever near the handle, said scale means including an upper surface and having an arcuate groove arranged to be traversed by the pointer, said groove having a relatively narrow arcuate slot portion opening through the upper surface of said scale means; and, a unitary indicator member constructed from resilient material, said indicator member including an upstanding portion engageable with the pointer for moving said indicator member along said groove, an indicating portion disposed outside said groove adjacent said surface, a narrow connecting portion extending through said slot portion and a friction portion having angularly disposed end portions that are wider than said slot portion and groove in an unstressed condition, and said friction portion being deformable to pass through said slot portion into said groove to frictionally engage said scale means in said groove.

2. The indicating device of claim 1 wherein said end portions are disposed at an oblique angle.

3. The indicating device of claim 1 wherein said scale means includes a set of graduations in torque units on each side of said groove and the indicating portion of said indicator member overlies both sets of graduations.

4. The indicating device of claim 1 wherein said end portions are disposed at an acute angle.

5. The indicating device of claim 4 wherein said scale means includes a set of graduations in torque units on each side of said groove and the indicating portion of said indicator member overlies both sets of graduations.

6. The indicating device of claim 5 wherein one set of graduations is in metric units of torque.

* * * * *